United States Patent
Foster

(10) Patent No.: US 6,432,315 B1
(45) Date of Patent: Aug. 13, 2002

(54) PROCESS FOR REMOVAL OF DISSOLVED COMPONENTS FROM SOLUTION

(75) Inventor: James J. Foster, Clinton, IA (US)

(73) Assignee: Archer-Daniels-Midland Company, Decatur, IL (US)

( * ) Notice: Subject to any disclaimer, the term of this patent is extended or adjusted under 35 U.S.C. 154(b) by 45 days.

(21) Appl. No.: 09/685,543

(22) Filed: Oct. 10, 2000

(51) Int. Cl.⁷ ............................................... B01D 37/02
(52) U.S. Cl. ...................... 210/728; 210/731; 210/737; 210/778; 210/916; 210/917; 426/495
(58) Field of Search ................................ 210/725, 727, 210/728, 731, 777, 778, 904, 905, 906, 912–917, 737; 426/490, 495

(56) References Cited

U.S. PATENT DOCUMENTS

| | | |
|---|---|---|
| 2,975,124 A | 3/1961 | Caldwell et al. |
| 2,995,513 A | 8/1961 | Paschall et al. |
| 3,423,312 A | 1/1969 | Blaisdell et al. |
| 3,835,114 A | 9/1974 | Hunt et al. |
| 3,842,005 A | 10/1974 | Moser et al. |
| 3,875,054 A | 4/1975 | Hunt et al. |
| 3,947,354 A * | 3/1976 | Swanson et al. ............. 210/727 |
| 3,962,076 A | 6/1976 | Hunt et al. |
| 4,238,329 A * | 12/1980 | Zievers ........................ 210/679 |
| 4,288,462 A * | 9/1981 | Hou et al. ................... 210/777 |
| 4,566,909 A * | 1/1986 | Yong et al. ..................... 127/33 |
| 5,008,018 A * | 4/1991 | Raible ......................... 210/717 |
| 5,575,915 A * | 11/1996 | Nakamura et al. .......... 210/631 |
| 6,132,625 A * | 10/2000 | Moffett ........................ 210/705 |
| 6,307,013 B1 * | 10/2001 | Chivers ....................... 530/311 |

FOREIGN PATENT DOCUMENTS

FI        763700        6/1978

OTHER PUBLICATIONS

Wurzburg, O.B. (ed.), "Modified Starches: Properties and Uses" (1986) pp. 113–129, CRC Press, Inc.; Boca Raton, Florida, U.S.A.

* cited by examiner

Primary Examiner—Peter A. Hruskoci
(74) Attorney, Agent, or Firm—Archer-Daniels-Midland Company

(57) ABSTRACT

A process for removal of dissolved components of a liquid solution containing multiple components is provided. The process relates to the addition of granular cationic starch to the liquid solution, heating the resultant mixture to gelatinize the starch and form a starch/component(s) complex, and separating the complex from the liquid. Alternatively, the starch may be pre-gelatinized and added to the liquid solution.

8 Claims, 1 Drawing Sheet

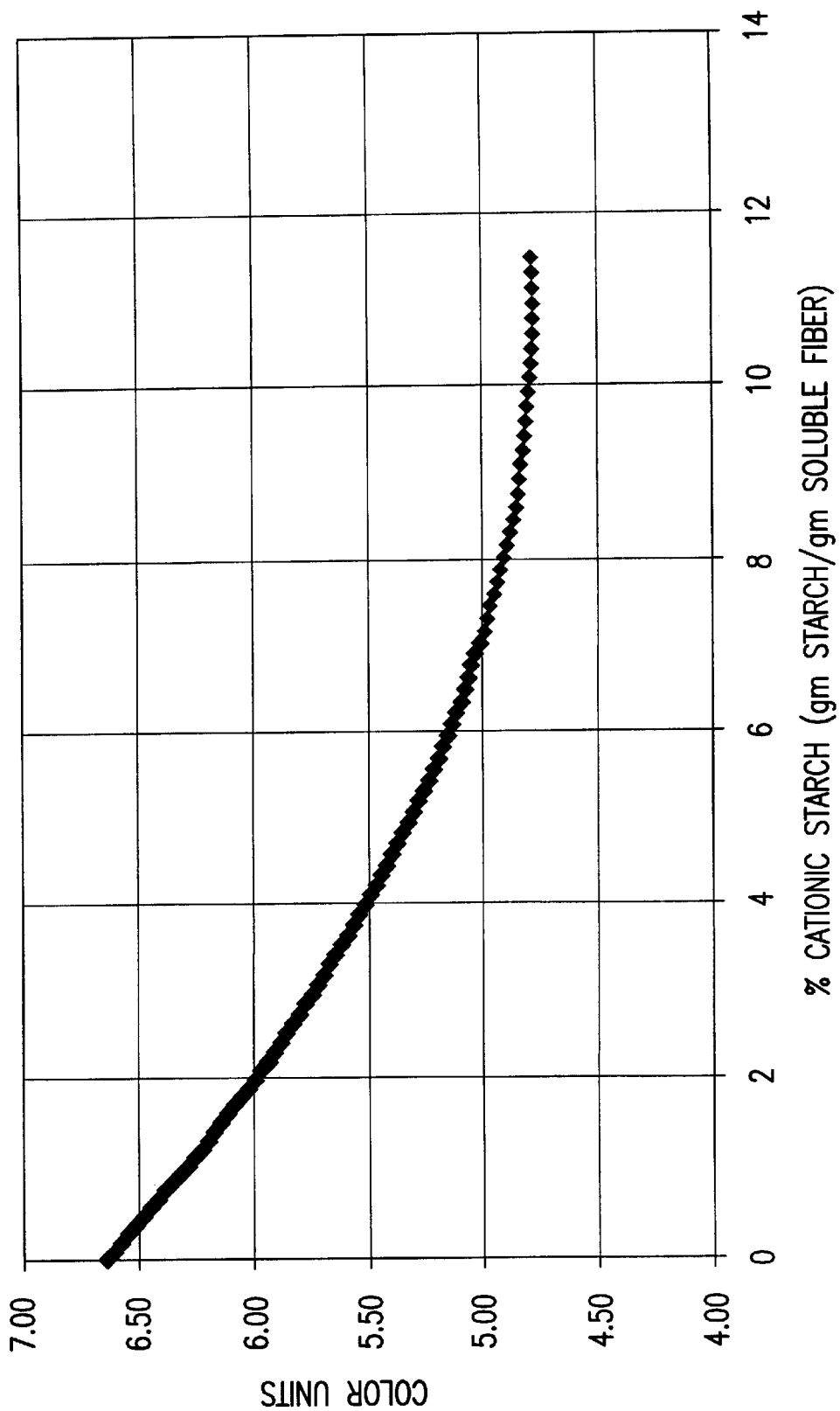

PROCESS FOR REMOVAL OF DISSOLVED COMPONENTS FROM SOLUTION

FIELD OF THE INVENTION

The present invention relates to a process for the removal of dissolved components from liquid solutions. More particularly, the present invention relates to the use of cationic starch to remove dissolved components or materials from liquid solution.

BACKGROUND OF THE INVENTION

There are currently a mind-boggling number of commercial/consumer oriented liquid products on the market, covering a vast range of product types. From a consumer perspective particularly, the color, flavor, and odor of certain products, and especially those products that are ingested, are often of significant importance. Blue coffee, or conceivably even green cola could be expected to meet with strong consumer resistance, and "bad" flavors and/or odors would be at least as unwelcome in commercial beverages and drinks.

In many instances, unwanted and/or unpleasant colors, odors and/or flavor characteristics are caused by the presence of certain components or impurities in a particular product. Often such impurities are by-products of the manufacturing process, and must be removed to make an acceptable product customers and consumers. One example of a product that must be de-colored through the removal of by-products is high fructose corn syrup. In the manufacturing of high fructose corn syrup, highly colored compounds are produced in the saccharification of starch step of the manufacturing process. These highly colored compounds can be removed using a number of techniques, such as by treatment with activated carbon, for example.

Although such impurities could conceivably be removed in the dry state, in fact in virtually all circumstances it is much easier to remove the impurities from a liquid phase. This could include removal of impurities from a liquid product or from a solution formed by dissolving a solid product in an appropriate liquid. In many cases the liquid will be water, but of course other liquids may be available.

Of course, for larger, particulate impurities, filtration processes can be used for removal. Screens, meshes and the like can be used for filtration, as can filtering media (also known as filter aid). The use of these filtration means is widespread, but of course these means work only for the removal of particulate impurities. However, as noted above, in many cases the impurities that impart unfavorable color, taste and odor characteristics are dissolved, and therefore are not removed, and generally cannot be removed, using such filtration methods. Furthermore, filtering media cannot be regenerated, and therefore has certain economic disadvantages due to replacement and disposal costs.

Dissolved impurities are typically removed from liquids using ion exchange and/or decolorization resins, which have the advantage of being regenerable using the appropriate acid and/or base. Such resins are typically expensive, however, and the use of corrosive chemicals and large quantities of rinse water (that must be treated prior to its return to the environment) in the regeneration process are disadvantages to their use.

Alternatively, impurities may be removed from solution using activated carbon, which is both porous (similar to filtering media) and slightly charged on its surface (analogous to ionic resins). Activated carbon also has disadvantages associated with its use; powdered activated carbon is very effective at removing impurities, but it is difficult to handle. Granular carbon is easier to work with, but is less effective at removing impurities. Furthermore, like filtering media, powdered carbon is a single-use material, and while granular carbon can be regenerated in specially designed furnaces, the furnaces are expensive to operate.

Another material that has been used in the art to remove solid particles from solution is cationic starch. The art has characterized this process as one of "flocculation", which is defined as "[t]he combination or aggregation of suspended solid particles in such a way that they form small clumps of tufts resembling wool." Hawley, G. G., ed., *The Condensed Chemical Dictionary*, $8^{th}$ Ed., Van Nostrand Reinhold Company, New York, 1971. Pertinent patents describing the use of granular starch as a flocculation aid are U.S. Pat. No. 2,975,124 (Caldwell et al.); U.S. Pat. No. 2,995,513 (Paschall et al.); U.S. Pat. No. 3,423,312 (Blaisdell et al.); U.S. Pat. No. 3,835,114 (Hunt et al.); U.S. Pat. No. 3,842,005 (Moser et al.); U.S. Pat. No. 3,875,054 (Hunt et al.); and U.S. Pat. No. 3,962,079 (Hunt et al.). In each case, however, these disclosures relate to the use of the cationic starch for the removal of finely divided materials from a fluid by flocculation.

It is apparent from the foregoing that a need exists for a method for the removal of dissolved impurities from solution that does not involve a medium that 1) must be replaced after each use; 2) must be regenerated using corrosive chemicals; and 3) is not difficult and/or costly to recycle. It is the purpose of this invention to address this and other needs in the art in a manner more apparent to the skilled artisan once given the following disclosure. Furthermore, it should be emphasized that the materials or components that one may wish to remove from a particular liquid phase solution may not be an "impurity" in the sense that the component to be removed is per se undesirable. For example, a particular metal may not be desirable in the final product from which the metal has been removed, but the metal itself may have value in its purified or isolated form.

SUMMARY OF THE INVENTION

The present invention relates to the inventor's surprising finding that cationic starch can remove dissolved impurities and other types of dissolved components or materials from a solution. In addition, the cationic starch can be safely and easily handled, and can also be recycled into a variety of beneficial end-uses, and the removed components may have value if they are separated from the cationic starch.

The process of the invention generally involves the mixing of granular cationic starch with the solution to be purified. This mixture is then heated to cause the cationic starch to gelatinize (this process is sometimes referred to as "cooking out the starch"). The cationic starch molecules are released from the starch granule, whereupon they complex with the impurities contained in solution. The treated solution is then separated from the cationic starch/impurities complex using standard methods used by those skilled in the art.

In an alternative embodiment, the starch can be pre-gelatinized before it is mixed with the solution to be treated. In the preferred embodiment, a small amount of filter media is added to assist the separation of the cationic starch/impurities complex from the treated solution.

BRIEF DESCRIPTION OF THE DRAWING

FIG. 1 shows the decrease in concentration of colored dissolved component(s) in a soluble fiber solution with increasing concentration (gm starch/gm soluble fiber—% by weight) of cationic starch used according to the process of the invention.

DETAILED DESCRIPTION

The present invention relates to the use of cationic starch for the removal from solution of various impurities that can impart unacceptable characteristics (color(s), odor(s), and/or flavor(s)) to a liquid. Cationic starch is combined with the solution to be purified. If the starch is granular it is "cooked out" by heating the mixture; if the starch is already "cooked out", additional heating is not necessary. The cationic starch is allowed to complex with dissolved impurities in the solution, and the treated solution is then removed from the cationic starch/impurities complex using various art-recognized methods, for example using filtration techniques, or centrifugation. In preferred embodiments of the invention, a small amount of filter media is added to the solution along with the granular cationic starch to assist the separation of the cationic starch/impurities complex from the treated solution.

Cationic starch is made by reacting starch with chemicals including, but not limited to, those having amino, imino, and ammonium groups, all of which have positive charges. See, e.g., Wursburg, O. B., ed., *Modified Starches: Properties and Uses*, pp. 113–129, CRC Press, Boca Raton, Fla. (1986), in which the source, production and other uses of cationic starches are described. These cationic starches are commercially available from a variety of companies including Archer Daniels Midland Company and National Starch, among others.

The structure of a typical cationic starch may be helpful in better understanding the invention. The following structure is that of a cationic starch made using a quaternary ammonium compound:

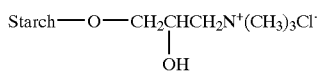

Without intending to be limited by theory, it is believed that the charged portion(s) of the cationic starch attracts negatively charged impurities, thereby facilitating the binding of the impurities to the starch molecules. It is also possible that particular types of impurities could be attracted to the organic portion of the starch molecule. In any event, it is sufficient to state that some form of complex forms between the impurity and the cationic starch.

The use of granular cationic starch in the process of the claimed invention allows the practitioner to more closely measure the amount of starch needed for a particular purification. In addition, granular cationic starch is much easier to transport and can be stored indefinitely in the dry state, making it far superior to gelatinized starch, which has a sort shelf-life due to its being an excellent food source for microbes. The ease of transport and storage allows one, if one wishes, to produce granular cationic starch at one facility and move it anywhere it is needed, and/or to store the material for long periods of time. This is much more convenient and economical than the cationizing of gelatinized starch. Furthermore, the present invention utilizes cationic starches having a much lower degree of substitution (DS) than the known flocculation methods. Those methods utilize starches having a DS in the range of 0.4 or higher, whereas the DS of the cationic starch used in the present invention can be in the range of 0.05 or less, a factor of about 10 less than used in the flocculation methods discussed above.

Having provided a general description of the invention, a more particular understanding of the invention will now be provided through reference to the following Example. The Example is provided by way of illustration, and is not intended to limit the invention in any way, unless otherwise specified.

EXAMPLE 1

Statistically designed experiments were performed to test the process of the invention for the removal of colored impurities from a solution containing soluble fiber. Factors used in the statistical design included a pH of from 3 to 7; powdered carbon of from 0 to 11.5%; filter aid content of from 0 to 11.5%, and cationic starch content of 0 to 11.5%. The cationic starch used in the experiments had a DS of approximately 0.04, while the material to be treated contained approximately 30% solids, of which 55% was soluble fiber. For the experiments the pH of the solution was adjusted to the chosen target (between 3 and 7), and then the powdered carbon, filter aid, and/or cationic starch were added as required for the specific experimental run. The mixture was then agitated at room temperature for about 20–30 minutes to properly disperse the dried materials throughout the solution. Next, the mixture was placed in a boiling water bath for 30 minutes to gelatinize the starch. Any number of different time/temperatures can be used provided that the starch is adequately cooked out.) The mixture was then filtered through a Buchner funnel and in accordance with the measurement protocol, the filtrate was adjusted to 10% solids and the absorbance at 420 nm was measured to obtain the color.

The results of a statistically designed experiment can be analyzed to yield an equation. FIG. 1 shows the regression of the data from a designed experiment with the powdered carbon and the filter aid concentration set to zero and looking at the response of the cationic starch at a pH of 4.25. The results clearly show that the cationic starch lowered the color of the solution in direct proportion to the amount of added starch.

It should also be noted that the present invention is not only useful for removing undesirable impurities; valuable charged materials could also be removed from solution using the process of the invention.

Once the solution and the cationic starch/impurities complex have been separated, the complex can be recycled into a number of beneficial end-uses. For example, if the solution being processed is a food product and is innocuous, then the cationic starch/impurities complex can be recycled into animal feed. Alternatively, the cationic starch/impurities complex can be a foodstock for yeast in the production of ethanol. There are various other applications for the cationic starch/impurities complex once it is removed from the solution that those of skill in the art would recognize in light of the present disclosure.

Having now fully described the present invention in some detail by way of illustration and example, for purposes of clarity and understanding, it will be obvious to one of ordinary skill in the art that the invention can be performed by modifying or changing the invention with a wide and equivalent range of conditions, formulations and other parameters thereof. Furthermore, it will be obvious to the skilled practitioner that such modifications or changes are intended to be encompassed within the scope of the appended claims.

All publications and patents mentioned in this specification are indicative of the level of skill of those skilled in the art to which this invention pertains, and are hereby incorporated by reference herein to the same extent as if each individual publication or patent was specifically and individually indicated to be incorporated by reference.

What I claim is:

1. A process for the separation of one or more dissolved components from a liquid solution containing multiple components, the process comprising:

adding granular cationic starch to the solution to form a mixture, wherein the granular cationic starch is characterized as having a degree of substitution of equal to or less than 0.05;

heating the mixture until the starch gelatinizes and complexes with the one or more dissolved components to be separated; and removing the gelatinized starch/dissolved component(s) complex from the liquid by filtration or centrifugation.

2. The process of claim 1 wherein the gelatinized starch/dissolved component(s) complex is removed by filtration.

3. The process of claim 1 wherein the gelatinized starch/dissolved component(s) complex is removed by centrifugation.

4. The process of claim 1 further comprising adding filter aid to the solution along with the granular cationic starch.

5. A process for the separation of one or more dissolved components from a liquid solution containing multiple components, the process comprising:

gelatinizing granular cationic starch, wherein the granular cationic starch is characterized as having a degree of substitution of equal to or less than 0.05;

mixing the gelatinized starch with the liquid solution until the gelatinized starch complexes with the one or more dissolved components; and removing the gelatinized starch/dissolved component(s) complex from the liquid.

6. The process of claim 5 wherein the gelatinized starch/dissolved component(s) complex is removed by filtration.

7. The process of claim 5 wherein the gelatinized starch/dissolved component(s) complex is removed by centrifugation.

8. The process of claim 5 further comprising adding filter aid to the liquid solution along with the gelatinized starch.

* * * * *